United States Patent
Huppert et al.

(10) Patent No.: US 8,015,061 B2
(45) Date of Patent: Sep. 6, 2011

(54) FILE EXPORT CHANNEL

(75) Inventors: Andreas Huppert, Erfweiler-Ehlingen (DE); Dirk P Wagner, Schiffweiler (DE)

(73) Assignee: SAP AG, Walldorf (DE)

( * ) Notice: Subject to any disclaimer, the term of this patent is extended or adjusted under 35 U.S.C. 154(b) by 628 days.

(21) Appl. No.: 11/256,037

(22) Filed: Oct. 21, 2005

(65) Prior Publication Data
US 2007/0112846 A1 May 17, 2007

(51) Int. Cl.
*G06F 17/00* (2006.01)

(52) U.S. Cl. .................. 705/14.43; 705/14.13; 707/636

(58) Field of Classification Search ............... 705/14, 705/10, 14.1, 14.13, 14.14, 14.15, 14.16, 705/14.39, 14.43; 707/999.103 E17.005
See application file for complete search history.

(56) References Cited

U.S. PATENT DOCUMENTS

| | | | | |
|---|---|---|---|---|
| 4,901,224 A * | 2/1990 | Ewert | ............................. | 712/14 |
| 5,493,671 A * | 2/1996 | Pitt et al. | ............................. | 1/1 |
| 5,515,477 A * | 5/1996 | Sutherland | ....................... | 706/41 |
| 5,923,879 A * | 7/1999 | Sasmazel et al. | .............. | 717/143 |
| 5,999,937 A * | 12/1999 | Ellard | .................... | 1/1 |
| 6,542,933 B1 * | 4/2003 | Durst et al. | .................... | 709/229 |
| 6,871,183 B2 * | 3/2005 | Gilday et al. | ................... | 705/10 |
| 6,880,016 B1 * | 4/2005 | Van Der Heijden et al. | . | 709/230 |
| 6,889,222 B1 * | 5/2005 | Zhao | .................... | 707/3 |
| 7,035,855 B1 * | 4/2006 | Kilger et al. | .................... | 707/10 |
| 7,370,004 B1 * | 5/2008 | Patel et al. | .................. | 705/14.37 |
| 2003/0023476 A1 * | 1/2003 | Gainey | ............................. | 705/10 |
| 2003/0105949 A1 * | 6/2003 | Master et al. | ................. | 713/100 |
| 2003/0220866 A1 * | 11/2003 | Pisaris-Henderson et al. | . | 705/37 |
| 2004/0122735 A1 * | 6/2004 | Meshkin | ......................... | 705/14 |
| 2004/0210479 A1 * | 10/2004 | Perkowski et al. | ............. | 705/14 |
| 2004/0236621 A1 * | 11/2004 | Eder | ............................... | 705/10 |
| 2004/0249712 A1 * | 12/2004 | Brown et al. | .................... | 705/14 |
| 2005/0015529 A1 * | 1/2005 | Jung et al. | ........................ | 710/71 |
| 2005/0021346 A1 * | 1/2005 | Nadan et al. | ....................... | 705/1 |
| 2005/0091276 A1 * | 4/2005 | Brunswig et al. | .......... | 707/104.1 |
| 2006/0080426 A1 * | 4/2006 | Brunswig et al. | ............. | 709/223 |
| 2007/0094278 A1 * | 4/2007 | Huppert et al. | ................ | 707/100 |
| 2007/0112846 A1 * | 5/2007 | Huppert et al. | ........... | 707/103 R |
| 2007/0143186 A1 * | 6/2007 | Apple et al. | .................... | 705/14 |
| 2010/0088120 A1 * | 4/2010 | Gonzalvo | ......................... | 705/3 |

* cited by examiner

*Primary Examiner* — John G Weiss
*Assistant Examiner* — Adam Chornesky
(74) *Attorney, Agent, or Firm* — Kenyon & Kenyon LLP

(57) ABSTRACT

Data may be exported from a media campaign to an external processing device using a specifically designated communication channel within the media campaign application. When the media campaign application is executed, the campaign is directed to contacting various business partners using one or more communication means. With this media campaign application, a channel selection command may be received, where the channel selection command indicates the selection of an export channel selection. When the channel selection is the export channel selection, the application provides for the compilation of the business data and writing the data to an export file. The business data is compiled into an open format that is readily usable by an external application. After the file is generated, the export file is thereupon transmitted to a storage device.

16 Claims, 3 Drawing Sheets

FILE EXPORT CHANNEL

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to exporting data and more specifically to facilitating the providing business partner specific data in the execution of a media campaign.

Data management applications act as a central repository to manage vast amounts of data using centralized interfaces. This data is useful not only within the application but can be used externally as well. In one example of a data management application, such as a customer resource management (CRM) application, a user may be able to generate and execute a media campaign. The media campaign may be a combination of various functions relating to contacting customers or prospective customers for any number of a variety of reasons. For example, the campaign may include contacting prospective customers in a chance to offer for sale a particular product or service. In another example, the contact may be to existing customers to send an information letter or other type of contact.

In the execution of this campaign, the system may perform various functions, such as combining a list of customers and customer data with one or more forms of output, referred to a communication channel. In an example of an email campaign, a list of email addresses may be used to provide a mailing list for a mass mailing. The system may have email addresses in a particular file or storage location. This file may be accessed and the addresses used to direct the transmission of the message. The communication channel would be email and the content of the campaign would be the predefined email content possibly personalized with customer data.

The system may have other benefits, such as using other types of data with the transmissions. For example, the contact data may be not only the email address, but also the contact's name, which can be included in an introduction section. In these systems, automated campaigns can be set up to use this data. Although, the usage of the data is not monitored. For example, if the contact data is incorrect, the system has no way of knowing this, but rather sends an email that is never received. Other similar systems and techniques may be used for types of contact, including sending a physical mailing using a postal delivery, sending a facsimile, a page, a short messaging system (SMS) message or other techniques.

In existing campaign execution applications, a user sets up a campaign by selecting various amounts of data to define the campaign. The user also selects the communication channel selection which indicates the corresponding communication channel for the campaign. In these systems, the channel includes different available communication techniques, such as fax, email, SMS, telephone, postal delivery and other available means. These systems also include an open field which is a generic designation where a communication channel is not defined.

It is becoming common for users to have a second party to perform various steps of the campaign instead of whereas previously all steps of the media campaign were performed internally. In the existing systems, the campaign may be executed by one or more parties performing different steps and the underlying data for the campaign must made available. Therefore, the second parties need business partner data, which is the data relating to the contacts. This data is stored within the data management application and the current campaign execution applications do not have specific functionalities for extracting and sharing this data.

One available technique in the current systems is the utilization of the open channel. In this approach, the user may enter information into a predefined form and select the communication channel as the open channel. Due to system requirements associated with the selection of the open channel, this data is not in a readily usable format. Furthermore, the data is assembled as various communication elements that have not been assigned a particular means for being outputted. Using the open channel designated for transmitting data is problematic because exporting data is beyond the purpose of this feature. Therefore, the open channel designation may be used to create a data specific file, this file is not readily transmittable and cannot be easily used by any external application.

DETAILED DESCRIPTION

Data may be exported from a media campaign to a storage device using a specifically designated communication channel within the media campaign application. When the media campaign application is executed, the campaign is directed to contacting various business partners using one or more communication means. With this media campaign application, a channel selection command may be received, where the channel selection command indicates the selection of one of a plurality of communication channels. In the application, a designation is provided so that the channel selection command may indicate an export channel selection.

When the channel selection command is the export channel selection, the application provides for the compilation of the business data and writing the data to an export file. The business data is compiled into an open format that is readily usable by an external application. Similarly, the export file is a specific file formatted not for use in a media campaign, but rather is the assembly of the business data. After the file is generated, the export file is thereupon transmitted to the storage device. From these export files, business data may then be used for a media campaign using one or more communication means.

Figure 1:
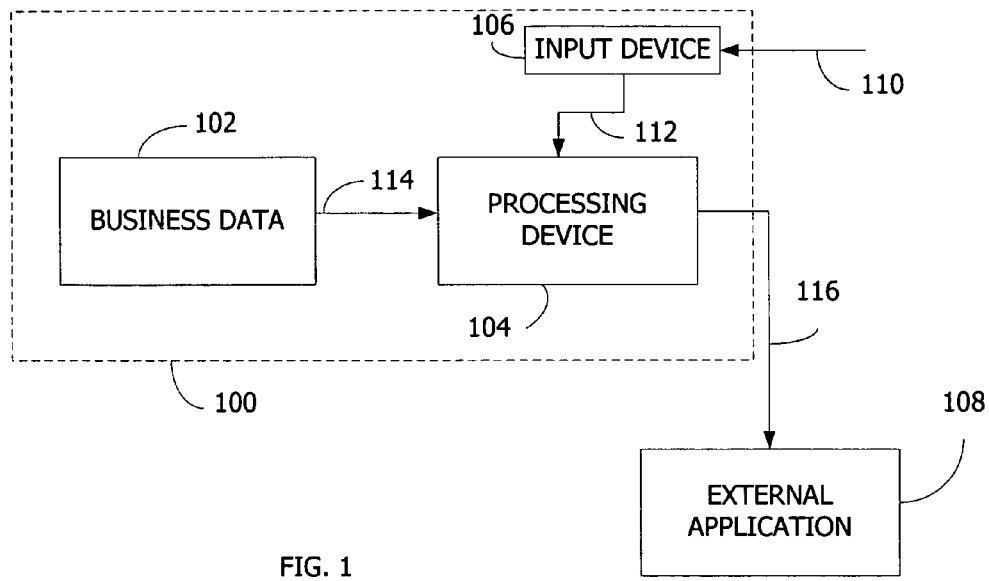
FIG. 1 illustrates a block diagram of one embodiment of a system for executing a media campaign.

More specifically, FIG. 1 illustrates an apparatus 100 for exporting data relating to a media campaign. The apparatus 100 includes a business data storage device 102, a processing device 104, an input device 106 and the apparatus 100 is communication with an storage device 108.

The apparatus 100 may be associated with a data management application, such as a CRM application, where the processing device 104 executes a media campaign. The business data storage device 102 and storage device 108 may be any suitable storage devices providing the storage of business data therein and export data, respectively. The business data is one or more data structures, encoded in the data management encoding format consistent with the data management application. In one exemplary embodiment, the data structure of the business data may be a DDIC format associated with an ABAP encoding as available from SAP. The business data includes various data fields associated one more business contacts, for example name, address, phone numbers, email, fax number, and other information. The business data in the business data storage device 102 may be similar to other data used in existing data management applications.

The input device 106 may be any suitable device providing for the receipt of an input 110, which may be a standard input command such as a keystroke or mouse-click in the embodiment of a graphical user interface.

In the embodiment illustrated in FIG. 1, the processing device 104 executes the media campaign, which may be a software application providing for the generation of a campaign for contacting business partners. In one embodiment, the selection of business partners, the content of the information to be sent and the means for contacting the business partners are selectable by a user. In one embodiment, a graphical user interface may be utilized to allow a user to perform these functions.

In this embodiment, the input device 106 receives the input 110, which includes a channel selection command. In the example of a graphical user interface, this selection may be made using a pull down menu and selection a particular feature. Prior to receipt of this input 110, the processing device 104 is operative to perform various functions associated with the media campaign, including executing a campaign execution application for contacting a plurality of customers, which may including launching the associated application within the data management application.

The processing device 104, in providing interactive options through an interface, receives the channel selection command 112 which indicates the selection of one of a plurality of communication channels. In this media campaign application, there are a wide variety of communication channels which relate to the means in which the business partner may be contacted. In this embodiment, if the processing device determines the channel selection command is the file export channel, the processing device compiles business data 114 which is extracted from the business data storage device 102. This information is compiled based on the factors of a form that is actively selected within the application as discussed in further detail below.

Once the business data 114 is compiled in the processing device 102, which includes selecting designated business data fields included in the business data, the data is written to an export file. The export file 116 is encoded in an open format, such as extensible markup language (XML) or a comma separated value (CSV) language. The export file 116 is a compilation of the format converted business data fields extracted based on the file export form. This export file 116 is then transmitted to the storage device 108. The device 108 may thereupon store these export files 116 therein.

Figure 2:
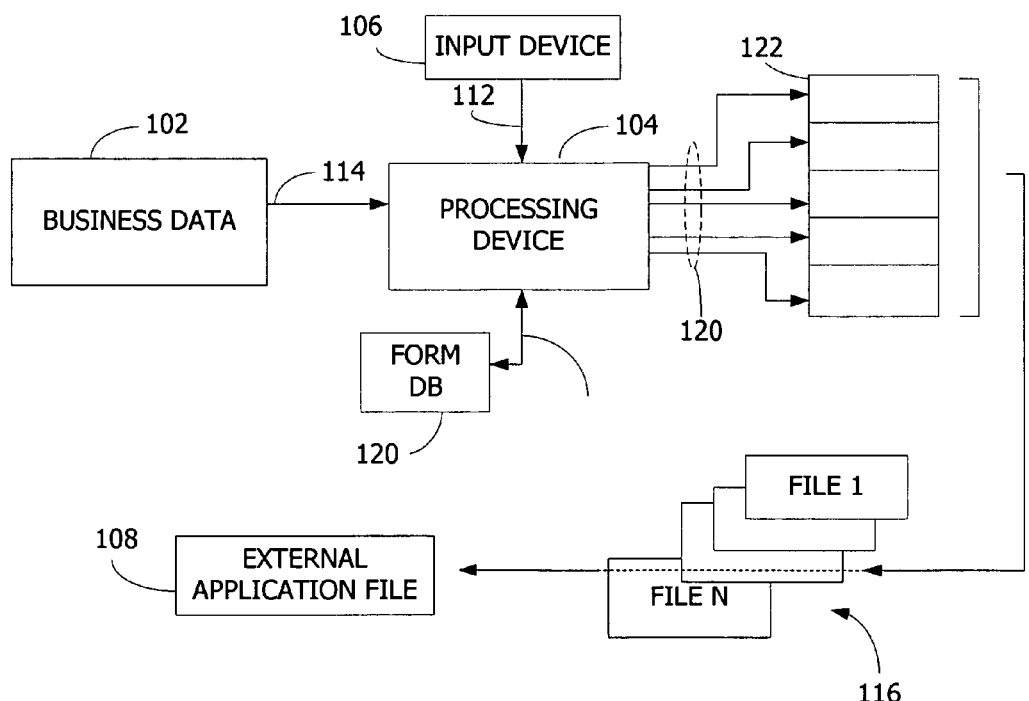
FIG. 2 illustrates a block diagram of one embodiment of the parallel data transfer using a data management application in executing a media campaign.

In another embodiment, as illustrated in FIG. 2, further benefits are realized by utilizing a parallel data transfer 120 when converting the business data 114. Similar to the embodiment of FIG. 1, the apparatus 100 includes the business data storage device 102, processing device 104, input device 106, the apparatus in communication with the storage device 108. Further illustrated is a temporary buffer 122 that allows for parallel data transfer 120 of the compiled data from the processing device 104.

Once data is converted, the converted business data is then ready for transfer. The processing device 104 significantly improves data transfer efficiency by performing parallel transferring of the database data to the temporary buffer 122. Using multiple transfer commands, the converted business data is then transferred in parallel to the temporary buffer 122. It is also noted that because of the parallel data transfer functionality, the compilation and conversion of the business data may use various techniques to improve efficiency because the temporary buffer 122 does not have to be written to the buffer 122 in a serial fashion.

After the full transfer 120 of the converted data, the converted data set composes a plurality of export files, shown graphically at 116. The export files 116 represent each of the business partners selected based on the business data 102 and user instructions. In one embodiment, each business partner is designated in a separate file 116 for the external application to perform the communication using a corresponding designated communication channel.

Another embodiment illustrated in FIG. 2 is the selection of an export channel form 124 from a form database 126. Through the input device 106, a form selection command (not expressly illustrated) may be received. This selection command indicates which one of the available forms in the forms database is to be loaded into the media campaign application running on the processing device 104. The user, through the input device 106, selects the selected form 124 which is retrieved from the database 126.

Figure 3:
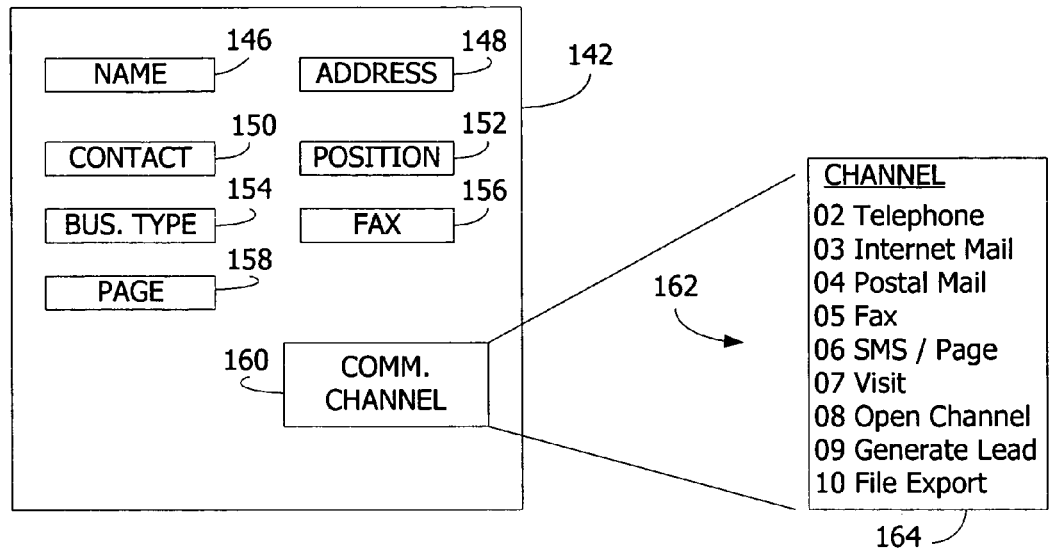
FIG. 3 illustrates a graphical representation of a screen shot of one example of a campaign execution application user interface.

This form, which is illustrated in further detail with respect to FIG. 3, provides for the designation of various business data fields. These business data fields indicate the components to be extracted and compiled into the subsequent files 116. In one embodiment, the file export form may be a type of mail form usable with an electronic mailing application. One embodiment may be a business processed optimized smartform. The file export form is also to be attached or coordinated with a particular campaign, which provides for the subsequent usage of the business data fields in the files 116 generated using the forms. It is also noted that the file export form may be readily modified to change the corresponding business data fields as needed for a particular campaign.

FIG. 3 illustrates a graphical representation of one embodiment of a screenshot within a user interface in the campaign execution application. The screenshot 140 displays a sample data form 142, which may be a file export form is a selection communication channel is the file export. The form 142 includes a plurality of form fields such as a name field 146, an address field 148, a contact person field 150, a position of the contact person field 152, a business type field 154, a fax number field 156 and a page field 158 (collectively referred to as 144-158).

The form 142 also includes a communication channel field 160. Using known techniques for selecting a data element for a data field, the communication channel field 160 may provide a user with a list of available channels 162. Illustrated in a second window 164, this display may be providing using multiple windows in a graphical user interface environment. In the illustrated example, multiple channels 162 are listed, such as telephone channel providing for calling the business partner, internet mail for sending an email, postal mail for sending regular mail, and others. The channel list 162 also includes the open channel, which as discussed above is a generic field providing for a non-defined communication channel. Furthermore, the user is presented with the open of the file export communication channel in the list 162.

In one embodiment, a user utilizing the campaign execution application loads the form 142 from the form database. The form 142 includes predefined form fields, as illustrated. In other embodiments, the user may select or remove different fields to customize the form. And it is in this form that the communication channel 160 is selected.

Figure 4:
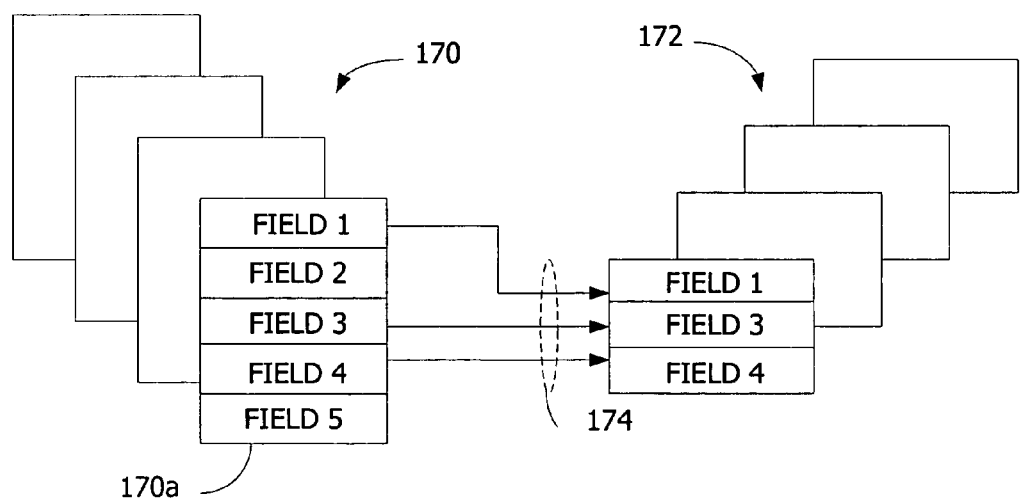
FIG. 4 illustrates a graphical representation of one embodiment of the generation of export files.

FIG. 4 illustrates a graphical representation of generation of the export file when the communication channel is designated as the open channel. Business partner data 170 may include numerous amounts of data in designated blocks associated with different partners.

Based on the defined filtering aspects in a file export form, which may be a form that includes the file export as the designated communication channel, selected business data fields are transferred. In the illustrated example of FIG. 4, the business data 170a includes 5 data fields. From these five fields, only 3 fields are utilized for a subsequent export file 172.

In one example, as illustrated in FIG. 4, an export file 172 is generated for each of the business data blocks 170. Although the export file may include numerous business data blocks, for example if the business partner data all related to the same campaign. In this example, since only three of the five fields are included, the export file 172 is generated by the selective data transfer 174 of only the designated fields. In one embodiment, similar to the embodiment described above with respect to FIG. 2, the transfer 174 may be done in a parallel data transfer. In another embodiment, a filtering operation may also be used to exclude the extra business data fields to leave only the designated fields in the export file.

Through this technique, multiple export files 172 are generated, where these export files include the business data information. Not specifically illustrated, the business partner data 170 is also translated so that it is readily usable by an external application. For various open formats, there include specific formatting protocols, such as the utilization of header, body and footer information in an XML format or the inclusion of data dividing elements in a CSV format. This business partner data 170 contained in the data fields 172 is typically stored in a format associated with the data management application so that the data conversion to an open format allows the external application to read the export file. It is with this export file the external application may then proceed performing one or more steps of the media campaign.

Figure 5:
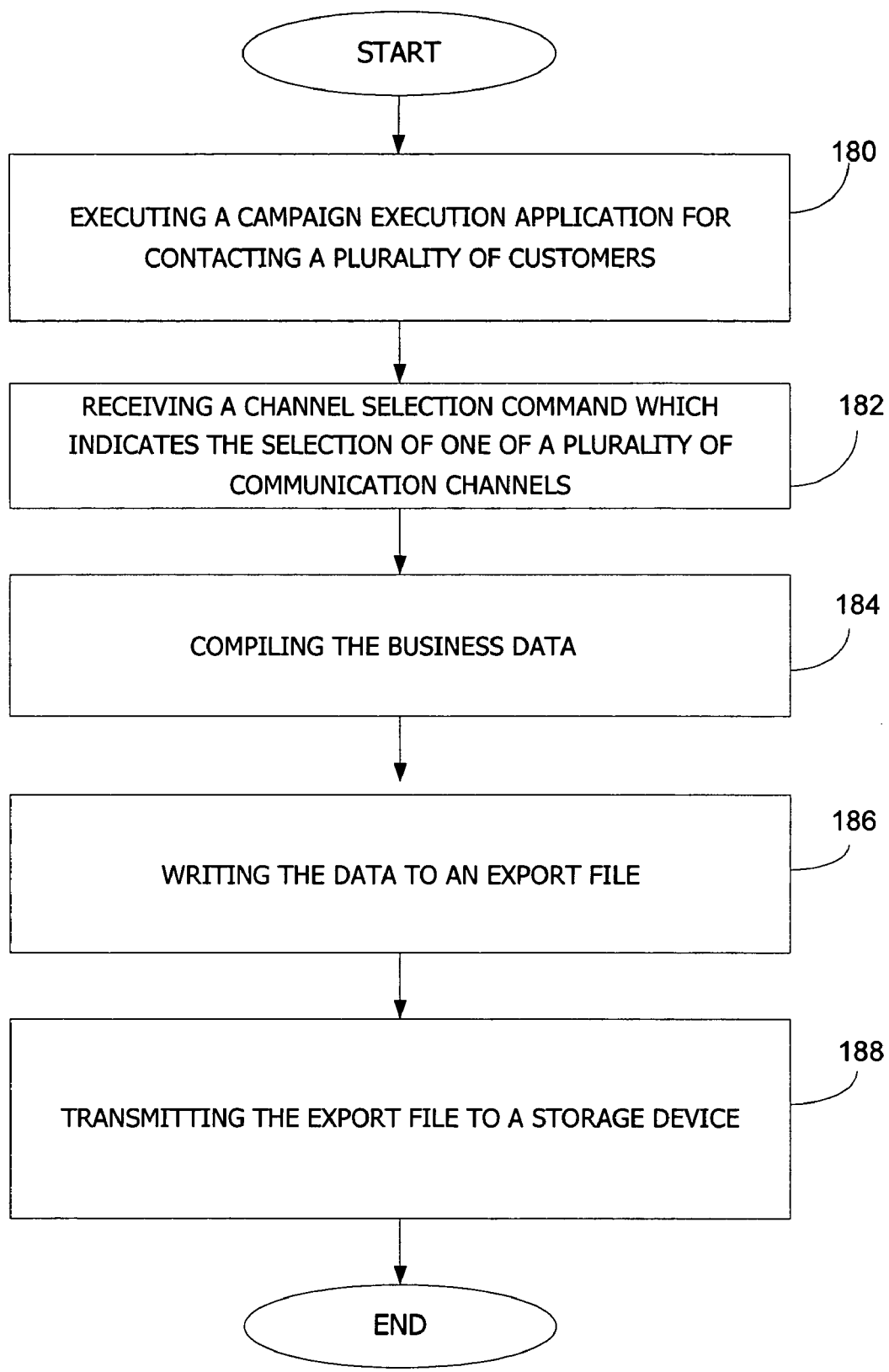
FIG. 5 illustrates a flowchart of the steps of one embodiment of a method for exporting data relating to a media campaign to an external processing device.

FIG. 5 illustrates the steps of one embodiment of a method for exporting data relating to a media campaign to an external processing device. The first step, step 180, of the method is executing a campaign execution application for contacting a plurality of customers. This may be performed by launching an application or module within a CRM system of other type of a data management application.

The next step, step 182, is receiving a channel selection command which indicates the selection of one of a plurality of communication channels. The channel selection command may be a user-input command received through an input device. The command selects a particular type of channel for a form or other type of campaign, where the channel provides the means for contacting an intended business partner. The next step, steps 184 and 186, is that if the channel selection command indicates a file export channel, the business data is complied and written to an export file. As described above, the compilation includes converting the business data from a data management format to an open format, such as from a DDIC format to a CSV or XML format. Also as similarly described above, the writing of the converted business data to an export file may be performed using a parallel data transfer to a temporary buffer. From that temporary buffer, the export file may be serially transferred.

The next step, step 188, is the transmitting the export file to a storage device. When the export file is generated for a campaign execution, and the export file may be used to help execute one or more campaigns. The export file provides requested business partner information usable by the external application for performing its intended step in the campaign.

Through the addition of the file export channel in the campaign execution application, business partner data may be readily transferred in a dedicated channel. This data may be provided to a storage device or systems that can readily use this data for carrying out one or more parts of a campaign. It is also through the inclusion of converting the data into an open format and utilizing a parallel data transfer, the execution of the campaign when using outside parties is improved.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for conducting a media campaign, the apparatus comprising:

a memory device storing business data relating to a plurality of business partners, the business data stored in a first file format, wherein the first file format is an encoded file format readable by an executable customer resource management (CRM) application and is a data dictionary (DDIC) format associated with an Advanced Business Application Programming (ABAP) encoding;

an input device receiving a channel selection command; and a processing device operative to, in response to executable instructions:

execute the CRM application having stored therein processes for a media campaign, the processes identifying communication channels including a file export channel to be used to communicate with business partners, the CRM application further storing contact data in the first file format for business partners to be communicated with pursuant to the media campaign;

receive a communication channel request from the input device, wherein the communication channel request defines a communication medium for contacting business partners;

receive a channel selection command which indicates the selection of one of communication channels;

when the channel selection command indicates the media campaign is to be conducted external to the CRM application and the selected communication channel is the file export channel:
  receive a file export form request;
  retrieve the file export form from a form database, the file export form containing filtering criteria identifying a subset of contact data fields;
  extract the contact data for business partners, wherein one or more selected contact data fields are extracted from the contact data based upon the selected communication channel and the file export form;
  convert the extracted contact data from the first file format to a second file format, wherein the second file format is an open file format;
  write the converted extracted contact data to a tabular export file;
  transfer the tabular export file to a temporary storage buffer using a parallel data transfer by executing a plurality of parallel transfer commands; and
  transmit, using a serial data transfer, the export file from the temporary storage buffer to a storage device of a second party to undertake the media campaign, the second party external to the CRM application; and
when the channel selection command indicates the media campaign is to be conducted internal to the CRM application:
  create automated communication messages for each business partner,
  receive the file export form request;
  retrieve the file export form from the form database;
  extract the contact data for business partners based upon the file export form to respective communication messages, and
  transmit the communication messages via the selected communication channel and the defined communication medium.

2. The apparatus of claim 1 wherein the file export form includes a plurality of form fields, each of the form fields corresponding to at least one data field of the data for business partners.

3. The apparatus of claim 2 wherein when the processing device extracts the contact data for business partners based on the file export form, only the data fields that correspond to the plurality of form fields are extracted from the memory device.

4. The apparatus of claim 1 wherein the open data format is at least one of: a CSV format and an XML format.

5. The apparatus of claim 1 wherein the processing device is further operative to:
  display a graphical user interface (GUI) for a user to define the file export form for the media campaign, the GUI including controls for selecting a communication channel and for selecting a plurality of fields each of the fields corresponding to at least one data field of the data for business partners, the communication channel defining a communication medium for contacting a business partner; and
  store the file export form associated with the media campaign.

6. The apparatus of claim 1, wherein the contact data for each of the plurality of business contacts is written to a separate tabular export file.

7. A computer-implemented method for conducting a media campaign, the method comprising:
  executing by a processor a customer resource management (CRM) application having stored on a computer-readable storage medium processes for programming the processor to conduct a media campaign, the processes identifying communication channels including a file export channel to be used to communicate with business partners, the CRM application further storing contact data for business partners to be communicated with pursuant to the media campaign, wherein the contact data is stored in a first file format, the first file format is encoded to be readable by the CRM application and is a data dictionary (DDIC) format associated with an Advanced Business Application Programming (ABAP) encoding;
  receiving a communication channel request from an input device, where the communication channel request defines a communication medium for contacting business partners;
  receiving a channel selection command which indicates the selection of one of the communication channels;
  when the channel selection command indicates the media campaign is to be conducted external to the CRM application and the selected communication channel is the file export channel:
    receiving a file export form request;
    retrieving the file export form from a form database, the file export form containing filtering criteria identifying a subset of contact data fields;
    extracting the contact data for business partners, wherein one or more selected contact data fields are extracted from the contact data based upon the selected communication channel and the file export form;
    converting the extracted contact data from the first file format to a second file format, wherein the second file format is an open file format;
    writing the converted extracted contact data to a tabular export file;
    transferring the tabular export file to a temporary storage buffer using a parallel data transfer by executing a plurality of parallel transfer commands; and
    transmitting, using a serial data transfer, the export file from the temporary storage buffer to a storage device of a second party to undertake the media campaign, the second party external to the CRM application; and
  when the channel selection command indicates the media campaign is to be conducted internal to the CRM application:
    creating automated communication messages for each business partner,
    receiving the file export form request;
    retrieving the file export form from the form database;
    extracting the contact data for business partners based upon the file export form to respective communication messages, and
    transmitting the communication messages via the selected communication channel and the defined communication medium.

8. The method of claim 7 wherein the file export form includes a plurality of form fields, each of the form fields corresponding to at least one data field of the data for business partners.

9. The method of claim 8 wherein when extracting contact data for business partners based on the file export form, only the data fields that correspond to the plurality of form fields are extracted from the memory device.

10. The method of claim 7 wherein the open data format is at least one of: a CSV format and an XML format.

11. The method of claim 7, further comprising:
  displaying a graphical user interface (GUI) for a user to define the file export form for the media campaign, the GUI including controls for selecting a communication channel and for selecting a plurality of fields each of the fields corresponding to at least one data field of the data for business partners, the communication channel defining a communication medium for contacting a business partner; and storing the file export form associated with the media campaign.

12. The method of claim 7, wherein the contact data for each of the business partners is written to a separate tabular export file.

13. A computer-readable storage medium including instructions that, when executed by a processor, perform the steps of:

executing by the processor a customer resource management (CRM) application; the CRM application further storing contact data for business partners to be communicated with pursuant to the media campaign, wherein the contact data is stored in a first file format, the first file format is encoded to be readable by the CRM application and is a data dictionary (DDIC) format associated with an Advanced Business Application Programming (ABAP) encoding;

identifying communication channels including a file export channel to be used to communicate with business partners;

receiving a communication channel request from an input device, wherein the communication channel request defines a communication medium for contacting business partners;

receiving a channel selection command which indicates the selection of one of the communication channels;

when the channel selection command indicates the media campaign is to be conducted external to the CRM application and the selected communication channel is the file export channel:

receiving a file export form request;

retrieving the file export form from a form database, the file export form containing filtering criteria identifying a subset of contact data fields;

extracting the contact data for business partners, wherein one or more selected contact data fields are extracted from the contact data based upon the selected communication channel and the file export form;

writing the extracted contact data to a tabular export file, which includes:

converting the extracted contact data for business partners from an open file format;

transferring, in parallel using a plurality of data transfer commands, the converted data to a temporary buffer;

after completing the transfers of the converted data, transferring the contents of the temporary buffer to the memory location associated storing the export files therein; and transmitting, using a serial data transfer, the export file to a storage device of a second party to undertake the media campaign, the second party external to the CRM application; and when the channel selection command indicates the media campaign is to be conducted internal to the CRM application:

creating automated communication messages for each business partner, receiving the file export form request;

retrieving the file export form from the form database;

extracting the contact data for business partners to respective communication messages based upon the file export form, and transmitting the communication messages via the selected communication channel and the defined communication medium.

14. The computer-readable storage medium of claim 13 wherein the file export form includes a plurality of form fields, each of the form fields corresponding to at least one business partner data fields of the business partner data such that when compiling the business data based on the file export form, only the business data fields that correspond to the plurality of form fields are extracted from the memory device.

15. The computer-readable storage medium of claim 13, wherein the contact data for each of the business partners is written to a separate tabular export file.

16. The computer-readable storage medium of claim 13, further comprising:

displaying a graphical user interface (GUI) for a user to define the file export form for the media campaign, the GUI including controls for selecting a communication channel and for selecting a plurality of fields each of the fields corresponding to at least one data field of the data for business partners, the communication channel defining a communication medium for contacting a business partner; and storing the file export form associated with the media campaign.

\* \* \* \* \*